(12) United States Patent
Neven et al.

(10) Patent No.: US 11,313,707 B2
(45) Date of Patent: Apr. 26, 2022

(54) MAGNETIC-INDUCTIVE FLOWMETER

(71) Applicant: Krohne AG, Basel (CH)

(72) Inventors: Joseph Neven, Romans (FR); Helmut Brockhaus, Oberhausen (DE)

(73) Assignee: KROHNE AG, Basel (CH)

( * ) Notice: Subject to any disclaimer, the term of this patent is extended or adjusted under 35 U.S.C. 154(b) by 320 days.

(21) Appl. No.: 16/254,662

(22) Filed: Jan. 23, 2019

(65) Prior Publication Data

US 2019/0226889 A1    Jul. 25, 2019

(30) Foreign Application Priority Data

Jan. 24, 2018   (DE) ..................... 10 2018 101 568.2

(51) Int. Cl.
  *G01F 1/58*      (2006.01)
(52) U.S. Cl.
  CPC .................................. *G01F 1/588* (2013.01)
(58) Field of Classification Search
  CPC . G01F 1/58; G01F 1/584; G01F 1/588; G01F 1/60
  See application file for complete search history.

(56) References Cited

U.S. PATENT DOCUMENTS

| | | | |
|---|---|---|---|
| 3,002,379 A | 10/1961 | Hurley | |
| 6,085,599 A | 7/2000 | Feller | |
| 9,399,089 B2 | 7/2016 | Nikolic et al. | |
| 2013/0075314 A1 | 3/2013 | Nikolic et al. | |
| 2015/0135852 A1 | 5/2015 | Efimov et al. | |
| 2016/0341366 A1 | 11/2016 | Nikolic et al. | |
| 2018/0313499 A1 | 11/2018 | Nikolic et al. | |

FOREIGN PATENT DOCUMENTS

| | | |
|---|---|---|
| DE | 1951378 A1 | 4/1971 |
| DE | 202008012801 U1 | 3/2010 |
| DE | 102010031433 A1 | 1/2012 |
| GB | 2312515 A | 10/1997 |

*Primary Examiner* — Erika J. Villaluna
(74) *Attorney, Agent, or Firm* — David S. Safran; Roberts Calderon Safran & Cole, P.C.

(57) ABSTRACT

A magnetic-inductive flowmeter for determining the flow of at least one medium, having first and second parallel measuring tubes for guiding the at least one medium, a magnetic field generating device for generating a magnetic field permeating the measuring tubes perpendicular to the flow direction of the at least one medium, first and second electrode pairs for respectively tapping a first and second measuring voltage induced in the medium, and an evaluation unit for evaluating the measuring voltages. Increased reliability in functioning of the flowmeter and the determined flow and flow difference values is achieved by the first and second electrode pairs being formed together by a first, second and third electrodes, the second electrode being both part of the first electrode pair and part of the second electrode pair and being arranged between the two measuring tubes. The electrodes are arranged perpendicular to the flow and magnetic field directions.

11 Claims, 4 Drawing Sheets

MAGNETIC-INDUCTIVE FLOWMETER

BACKGROUND OF THE INVENTION

Field of the Invention

The invention relates to a magnetic-inductive flowmeter for determining the flow of at least one medium, having a first measuring tube and having a second measuring tube for guiding the at least one medium, wherein the measuring tubes run parallel to one another, having a magnetic field generating device for generating a magnetic field permeating the measuring tubes perpendicular to the flow direction of the at least one medium, having a first electrode pair for tapping a first measuring voltage induced in the medium in the first measuring tube, having a second electrode pair for tapping a second measuring voltage induced in the medium in the second measuring tube, and having an evaluation unit for evaluating the measuring voltages.

Description of Related Art

The magnetic-inductive flowmeters in question are known from the prior art and are used, for example, in the field of medical technology, in particular dialysis. In magnetic-inductive measuring instruments, the principle of charge separation in a flowing—conductive—medium is used, which presupposes that the flow direction of the medium and the orientation of the magnetic field permeating the medium are not the same. Vertical alignment of the measuring tubes and the magnetic field is desirable but not absolutely necessary. When it is said that the magnetic field generating device is used to generate a magnetic field that permeates the measuring tubes perpendicular to the flow direction of at least one medium, then this means "essentially perpendicular" with reasonable appreciation. Charge separation ultimately leads to induced voltages, the measuring voltages, which are tapped via the electrode pairs.

In the case of generic flowmeters, emphasis is placed on comparing the flow rates in the first measuring tube and the second measuring tube, or on determining the flow difference between the flow rates in the first measuring tube and the second measuring tube. By determining the flow difference, it is possible to monitor whether, for example, the volume flows flowing into a body correspond to the volume flows flowing out of the body. Intended flow differences can also be monitored in a specific manner.

A disadvantage of the prior art is that faulty functioning of the flowmeters cannot be easily detected. It is especially necessary in the medical field that the magnetic-inductive flowmeters not only have a high measuring accuracy, but also a low failure rate and that measuring errors or device errors can be detected as quickly as possible in order to avoid damage to the patient.

SUMMARY OF THE INVENTION

Thus, the object of the invention is to provide a magnetic-inductive flowmeter with increased reliability in terms of its functioning and the determined flow values and flow difference values. Another object of the invention is to provide a method for operating such a magnetic-inductive flowmeter.

The object is initially and essentially achieved, namely in that the first electrode pair and the second electrode pair are formed together by a first electrode, a second electrode and a third electrode. The second electrode is both part of the first electrode pair and part of the second electrode pair. In addition, the second electrode is arranged between the two measuring tubes, wherein the three electrodes are arranged along an axis perpendicular to the flow direction of the medium and perpendicular to the direction of the magnetic field.

The indication that the three electrodes are arranged along an axis, this does not necessarily mean that all electrodes are on the same axis. Rather, one of the electrodes or two of the electrodes can lie on the axis and the other two electrodes or the other electrode can be arranged at a distance from the axis. However, it is important that the electrodes are arranged in one direction, i.e., are parallel. In a preferred design, the three electrodes lie on an axis. The arrangement of the electrodes along an axis means that the first measuring tube and the second measuring tube are not permeated by the same magnetic field lines.

The medium flowing in the first measuring tube can be the same as the medium flowing in the second measuring tube. However, the media can also be completely different media, or the medium in one measuring tube can correspond to the medium in the second measuring tube, wherein one of the media carries additives. It is not important for the invention whether the medium is the same or different.

The inventive design of the magnetic-inductive flowmeter results in the sum of the voltage tapped between the first and second electrodes and the voltage tapped between the second and third electrodes corresponds to the voltage tapped between the first and third electrodes.

The magnetic-inductive flowmeter can be operated in such a manner that the flow direction of the medium in the first measuring tube is opposite the flow direction of the medium in the second measuring tube. The sum of the tapped voltages is then effectively a difference and corresponds to the voltage difference. It is known that there is a linear relationship between the measured voltage and the flow rate, wherein the slope corresponds to a gain value and the axis intercept corresponds to an offset value. With absolutely identical design of the two measuring tubes and the same values for offset and gain, the flow difference between the first and second medium can be determined from the voltage difference. This makes it possible not only to check three voltage values for agreement, but also to check the resulting flow values for agreement.

The magnetic-inductive flowmeter can also be operated in such a manner that the flow direction of the medium in the first measuring tube corresponds to the flow direction of the medium in the second measuring tube.

Preferably, the second electrode implements an electrically conductive connection between the medium in the first measuring tube and the medium in the second measuring tube.

In a particularly preferred design of the magnetic-inductive flowmeter according to the invention, the second electrode is made up of a first partial electrode and a second partial electrode. The two partial electrodes are electrically connected to one another. In this design, the first electrode pair is formed by the first electrode and the first partial electrode of the second electrode and the second electrode pair is formed by the second partial electrode of the second electrode and the third electrode. Because the two partial electrodes of the second electrode are electrically conductively connected to one another, they are at the same potential, so that, even in this design of the magnetic-inductive flowmeter, the sum of the voltage tapped between the first electrode and the first partial electrode of the second electrode and the voltage tapped between the second partial electrode of the second electrode and the third electrode corresponds to the voltage tapped between the first and the third electrode.

The geometry of the first measuring tube and the second measuring tube can be identical.

In a preferred design of the magnetic-inductive flowmeter according to the invention, it is provided that the first measuring tube and the second measuring tube are materially connected to each other.

In an alternative design, the first measuring tube and the second measuring tube are formed in one piece. If the term one-piece is used here, this means that the two measuring tubes are manufactured together as one part and not that the two measuring tubes are manufactured separately and subsequently joined together.

In one design, the measuring tubes have a rectangular cross-section and thus have four walls. In a design in which the measuring tubes are made in one piece, the two measuring tubes have a common wall, i.e., a wall is part of both the first measuring tube and the second measuring tube. The second electrode is then arranged in this common wall.

The measuring tubes are manufactured by extrusion in a preferred design.

Magnetic-inductive flowmeters have magnetic field generating devices for generating a magnetic field permeating the measuring tube or tubes. In the magnetic-inductive flowmeter according to the invention, the magnetic field generating device has a coil arrangement and a control unit for applying a coil current to the coil arrangement. The coil arrangement has a first terminal and a second terminal for this purpose. A first coil current measuring device for detecting a first coil current is arranged between the control unit and the first terminal of the coil arrangement and a second coil current measuring device for detecting a second coil current is arranged between the second terminal of the coil arrangement and the control unit.

In addition to the magnetic field generating means, the magnetic-inductive flowmeter has an evaluation unit. The evaluation unit of the flowmeter according to the invention is designed in such a manner that it compares the first coil current and the second coil current. In the undisturbed case, the two coil currents are identical. If the two coil currents deviate from one another, there is an error state in the coil arrangement. In one design, the evaluation unit outputs an error message when the coil currents deviate from one another.

The coil arrangement is implemented by a single coil or by several coils connected in series.

A particularly preferred design of the magnetic-inductive flowmeter according to the invention is wherein the evaluation unit has a first evaluation unit and a second evaluation unit. The evaluation unit is designed in such a manner that the first evaluation unit and the second evaluation unit each independently determine measured values derived from the measuring voltages for the flow of the medium in the first measuring tube and the flow of the medium in the second measuring tube. Additionally or alternatively, a value for the flow difference in the first measuring tube and in the second measuring tube can be determined. The second evaluation unit then compares the flow measurement values of the first evaluation unit with its flow measurement values.

The previously performed coil current comparison can be carried out by the first evaluation unit or by the second evaluation unit or by both evaluation units.

In one design, the two evaluation units receive the same input values as the basis for their calculation. The received input values are compared with one another in one design. If the received input values differ from one another, there is an error in the transmission of the input values to one or both evaluation units. If the input values match and then the flow measurement values of the two evaluation units differ, the error is in one of the two evaluation units.

In another design, the first evaluation unit receives the first coil current measurement value from the first coil current measuring device and the second evaluation unit receives the second coil current measurement value from the second coil current measuring device. If the coil current measurement values of the two evaluation units deviate from each other, the error may also be due to an error in the coil current arrangement.

Another particularly preferred design of the magnetic-inductive flowmeter according to the invention is wherein the evaluation unit is designed in such a manner that it forms the sum of the measuring voltage between the first electrode and the second electrode and the measuring voltage between the second electrode and the third electrode and compares the sum value with the value of the measuring voltage between the first and the third electrode. If the evaluation unit has two evaluation units as described above, each of the two evaluation units can be designed so that it forms the sum of the measuring voltage between the first electrode and the second electrode and the measuring voltage between the second electrode and the third electrode and compares the sum value with the value of the voltage between the first and the third electrode.

In particular, the evaluation unit can be designed in such a way that it signals an error state if the values deviate from one another.

The signaling of the error state is carried out in different ways depending on the design. In one design, the evaluation unit has an output unit for outputting the measured values. The evaluation unit is then designed in such a manner that, in the event of an error state, communication between the first evaluation unit and the output unit is interrupted and/or communication between the second evaluation unit and the output unit is interrupted. As a result, no measurement values are output, in particular no erroneous measurement values are output. In particular, the evaluation unit can be designed in such a manner that the first evaluation unit communicates solely with the output unit. The second evaluation unit is then designed in such a manner that it interrupts communication between the first evaluation unit and the output unit in the event of an error. In a further design, an error message is transmitted to the output unit in the event of an error state. In particular, the output unit outputs the error message. The error message is transmitted to the output unit from the first evaluation unit or from the second evaluation unit.

In addition to the magnetic-inductive flowmeter, the invention also relates to a measuring tube arrangement for a magnetic-inductive flowmeter. The measuring tube arrangement according to the invention has a first measuring tube and a second measuring tube for guiding at least one medium. The measuring tubes run parallel to one another. Furthermore, the measuring tube arrangement has a first electrode pair for tapping a first measuring voltage induced in the medium in the first measuring tube and a second electrode pair for tapping a second measuring voltage induced in the medium in the second measuring tube. The first electrode pair and the second electrode pair are formed together by a first electrode, a second electrode and a third electrode, wherein the second electrode is both part of the first electrode pair and part of the second electrode pair, wherein the second electrode is located between the two measuring tubes and wherein the three electrodes are located along an axis perpendicular to the flow direction of the medium. In the mounted state and during operation of the magnetic-inductive flowmeter, the axis also runs—substantially—perpendicular to the direction of the magnetic field.

All designs made in connection with the magnetic-inductive flowmeter according to the invention with regard to advantageous designs of the measuring tubes and electrodes apply accordingly to the measuring tube arrangement.

In addition to the magnetic-inductive flowmeter, the invention also relates to a method for operating such a magnetic-inductive flowmeter.

The method according to the invention comprises the following steps, which are carried out by the evaluation unit: In a tapping step, a first measuring voltage is tapped between the first electrode pair, a second measuring voltage is tapped between the second electrode pair and a third measuring voltage is tapped between the first electrode and the third electrode. In an addition step, the first measuring voltage and the second measuring voltage are added and in a comparison step, the value of the added measuring voltages is compared with the value of the voltage tapped between the first electrode and the third electrode.

Since the mesh rule must apply to the tapped voltages as a whole, the method according to the invention can be used to easily check whether the magnetic-inductive flowmeter is functioning faultlessly. If the values compared with one another deviate from one another, an error state exists. Therefore, a preferred implementation of the method according to the invention provides that, in the event of a deviation of the values compared with one another, an error state is signaled in an error signaling step.

If the steps are carried out by the evaluation unit and the evaluation unit comprises a first evaluation unit and a second evaluation unit, then the steps can each be carried out by one of the two evaluation units or by both evaluation units. If the first evaluation unit and the second evaluation unit carry out the respective steps, then it can be provided in a preferred implementation of the method according to the invention that, in a further step, the second evaluation unit compares its results, in particular the result of the comparison of the sum voltage and the measuring voltage between the first and third electrode, with the results of the first evaluation unit. In this manner, a double check of the functional efficiency of the magnetic-inductive flowmeter is achieved.

A further preferred implementation of the method according to the invention is wherein in a flow determination step, the flow of the medium in the first measuring tube is determined in the first evaluation unit using the first measuring voltage, the flow of the medium in the second measuring tube is determined in the first evaluation unit using the second measuring voltage, the flow difference between the two measuring tubes is determined, the flow of the medium in the first measuring tube is determined in the second evaluation unit using the first measuring voltage, the flow of the medium in the second measuring tube is determined in the second evaluation unit using the second measuring voltage and the flow difference between the two measuring tubes is determined. In a comparison step, the second evaluation unit compares its values with those of the first evaluation unit. If the two values deviate from one another, an error state is signaled in one implementation.

In a further development of the method according to the invention, in the event of an error state occurring, communication between the first evaluation unit and the output unit and/or communication between the second evaluation unit and the output unit is interrupted in an interrupting step.

In a further development of the method according to the invention, an error message is output in an error output step.

All statements made in connection with the magnetic-inductive flowmeter about special designs and their advantages apply accordingly to the method according to the invention for operating such a magnetic-inductive flowmeter and vice versa.

In detail, there is a plurality of possibilities for designing, further developing or implementing the magnetic-inductive flowmeter according to the invention and the method according to the invention as will be apparent from the description of preferred embodiment in conjunction with the accompanying drawings.

DETAILED DESCRIPTION OF THE INVENTION

Figure 1A:
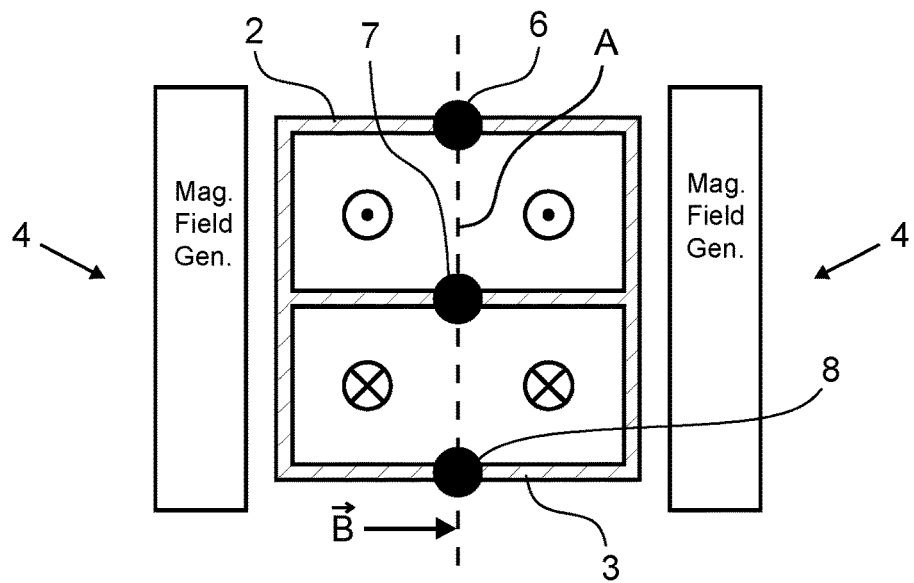
FIG. 1a schematically shows a first measuring tube arrangement.

FIG. 1a shows a part of the magnetic-inductive flowmeter 1, namely a first measuring tube 2 and a second measuring tube 3, which run parallel to one another. In the example shown, both measuring tubes 2, 3 have a rectangular cross-section and are identical in their geometry. In addition, the first measuring tube 2 and the second measuring tube 3 are made of one piece. Also shown is a part of a magnetic field generating device 4 belonging to the magnetic-inductive flowmeter 1, and which serves to generate a magnetic field B that permeates the measuring tubes 2, 3 perpendicular to the flow direction of the medium. The flow direction of the medium in the first measuring tube 2 is opposite the flow direction of the medium in the second measuring tube 3. A measuring voltage is induced in the conductive medium by the magnetic field.

A first pair of electrodes, having a first electrode 6 and a second electrode 7, is used to measure a first measuring voltage, which is induced in the medium in the first measuring tube 2. A second pair of electrodes, consisting of the second electrode 7 and a third electrode 8, serves to tap a second measuring voltage which is induced in the medium in the second measuring tube 3. The second electrode 7 is therefore both part of the first electrode pair and part of the second electrode pair, and is arranged between the first measuring tube 2 and the second measuring tube 3. The three electrodes 6, 7, 8 are arranged along an axis A which is perpendicular to the flow direction and perpendicular to the magnetic field B generated by the magnetic field generation direction 4.

It is shown that all three electrodes 6, 7, 8 are located on axis A. However, this is not mandatory. Rather, only one of the electrodes 6, 7, 8 or two of the electrodes 6, 7, 8 can be located on axis A, the other two or the other electrode can then be located at a distance from axis A, but in the direction of axis A. The magnetic field direction B is indicated by the arrow shown.

FIG. 1a shows a snapshot. As a rule, magnetic-inductive flowmeters 1 are operated with an alternating magnetic field, according to which the magnetic field direction B changes continuously by 180°. The arrangement shown shows that the measuring voltage between the first electrode 6 and the third electrode 8 corresponds to the sum of the first measuring voltage and the second measuring voltage. If there is a deviation, there is an error state that can be signaled directly. This ensures reliable operation of the magnetic-inductive flowmeter 1.

Figure 1B:
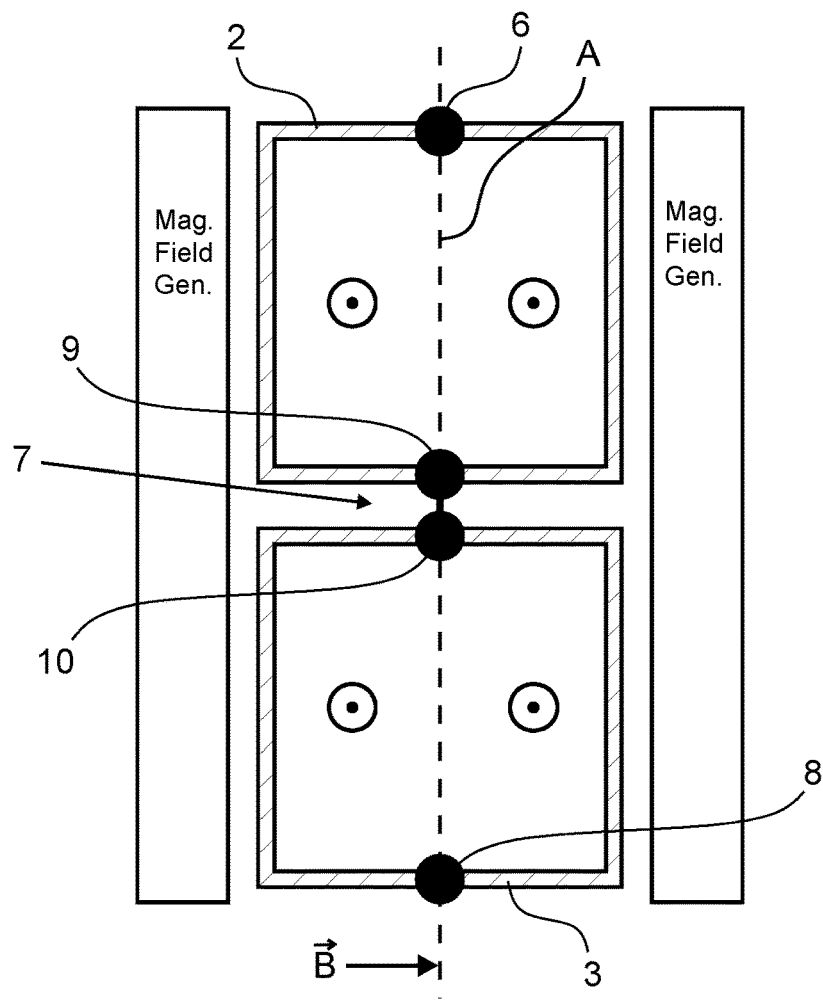
FIG. 1b schematically shows a second measuring tube arrangement.

FIG. 1b shows a further configuration. In contrast to FIG. 1a, the first measuring tube 2 and the second measuring tube 3 are not made of one piece and have a square cross-section in the direction of flow. The second electrode 7 consists of a first partial electrode 9 and a second partial electrode 10, which are electrically conductively connected to each other. The first electrode pair for tapping the first measuring voltage in the first measuring tube 2 is thus formed by the first electrode 6 and the first partial electrode 9 of the second electrode 7, whereas the second electrode pair for tapping the second measuring voltage in the second measuring tube 3 is formed by the second partial electrode 10 of the second electrode 7 and the third electrode 8. Due to this alternative design, the measuring voltage between the first electrode 6 and the third electrode 8 must correspond to the sum of the first measuring voltage and the second measuring voltage. Compared to the configuration in FIG. 1a, the geometry of the measuring tubes 2, 3 in the embodiment according to FIG. 1b—square cross-section in the direction of flow—has the advantage that the ratio of electrode distance to measuring tube extension in the magnetic field direction is greater. This measure automatically generates higher measuring voltages at the same flow rate. In advantageous configurations, the measuring tube geometry is selected so that the ratio of electrode distance to measuring tube extension in the magnetic field direction is greater than or equal to one. In contrast to FIG. 1a, FIG. 1b also shows that the flow direction of the medium in the first measuring tube 2 corresponds to the flow direction of the medium in the second measuring tube 3.

Figure 2:
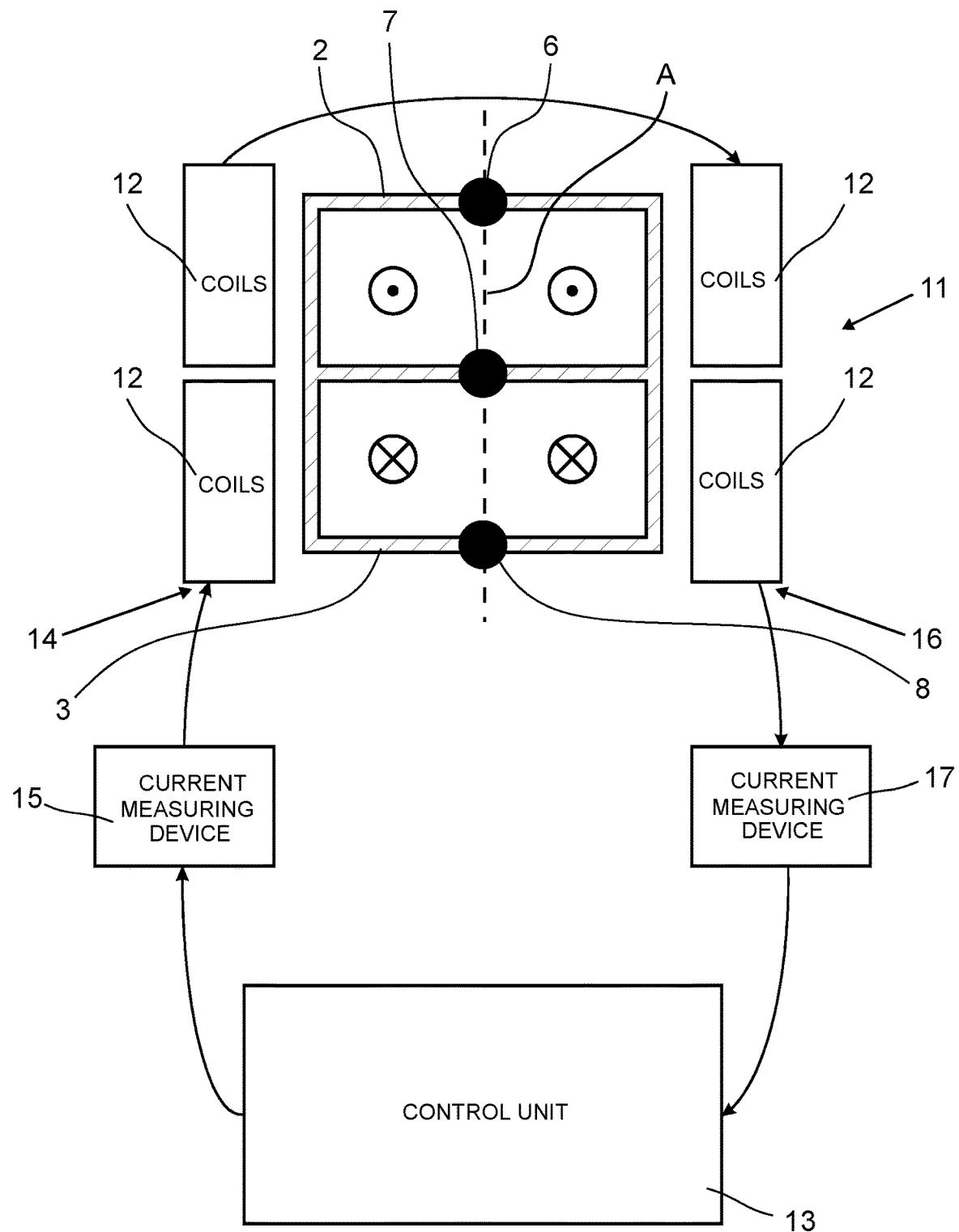
FIG. 2 schematically shows a measuring tube arrangement with a magnetic field generating device, FIG. 3 schematically shows a magnetic-inductive flowmeter with an evaluation unit.

FIG. 2 shows, in addition to the measuring tubes 2, 3 and the electrodes 6, 7, 8, the magnetic field generating device 4. The magnetic field generating device 4 has, as also shown in FIGS. 1a and 1b, a coil arrangement 11 which consists of several coils 12 connected in series. Coils 12 are connected in series to ensure that all coils 12 are supplied with the same coil current. The control unit 13 serves to apply the coil current to the coil arrangement 11. Between the control unit 13 and a first terminal 14 of the coil arrangement there is a first coil current measuring device 15 for detecting a first coil current, whereas between a second terminal 16 of the coil arrangement 11 and the control unit 13 there is a second coil current measuring device 17 for detecting a second coil current. In an evaluation unit 5 (not shown in FIG. 2, but shown in FIG. 3) the first and the second coil current are compared with one another. In the non-faulty state, the two values are the same. If the value of the first coil current differs from the value of the second coil current, there is an error in the coil arrangement 11 which can be directly detected.

Figure 3:
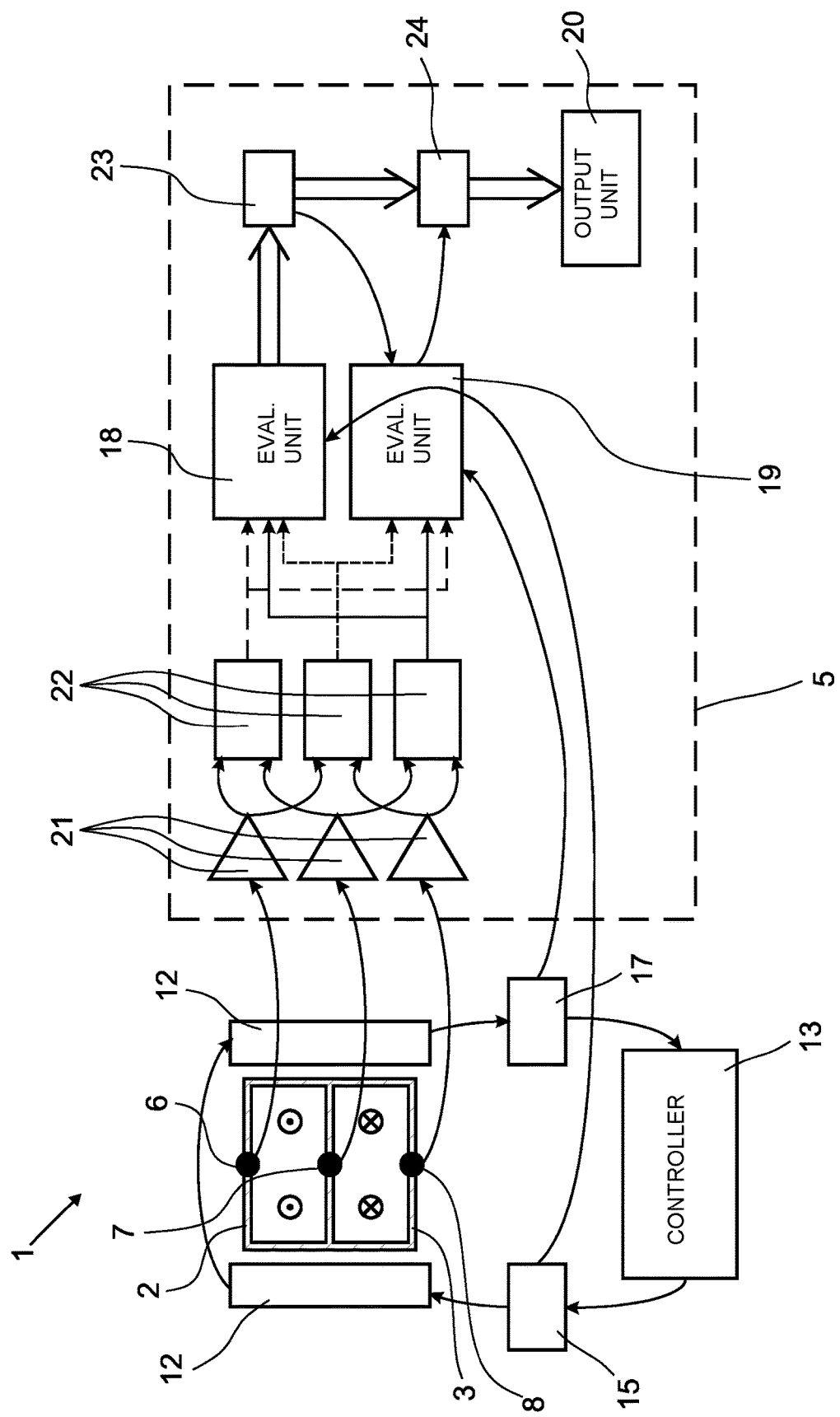

FIG. 3 shows a complete magnetic-inductive flowmeter 1. In addition to the measuring tube arrangement already described and the magnetic field generating device 4, the magnetic-inductive flowmeter 1 comprises the evaluation unit 5. The evaluation unit 5 essentially comprises a first evaluation unit 18, a second evaluation unit 19 and an output unit 20.

The electrodes 6, 7, 8 are each connected to high-impedance voltmeters 21, which are designed here as impedance converters implemented with operational amplifiers. The high input resistance of the voltmeter 21 ensures that the system is not (significantly) influenced by the measurement. The high-impedance voltmeter 21 is therefore particularly suitable for the measurement of low electrical voltages, as given here. The voltage results from the potential difference between the potential of an electrode and the base potential. The high-impedance voltmeters 21 are followed by analog-to-digital converters 22, which convert the difference between two voltages supplied by each of the voltmeters 21, i.e. analog voltage differences between two electrodes, into digital signals. The digital signals are then transmitted to the first evaluation unit 18 and to the second evaluation unit 19. The first evaluation unit 18 and the second evaluation unit 19 independently calculate values for the flow of the medium in the first measuring tube 2, the flow of the medium in the second measuring tube 3 and/or the flow difference. The evaluation units 18, 19 also independently check whether the sum of the first measuring voltage and the second measuring voltage corresponds to the voltage between the first electrode 6 and the third electrode 8. The second evaluation unit 19 reads in the data of the first evaluation unit 18 via a read-back unit 23 and compares this with its own data. If the data match, there is no error in the system. In the example shown, the second evaluation unit 19 then sets an interrupter 24 to a first switching state so that communication can take place between the first evaluation unit 18 and the output unit 20. The first evaluation unit 18 transmits its data to the output unit 20, where it is displayed to a user. If there is an error state, i.e., the data determined by the first evaluation unit 18 deviates from the data determined by the second evaluation unit 19, then the interrupter 24 is placed in a second switching state by the second evaluation unit 19, which causes communication between the first evaluation unit 18 and the output unit 20 to be interrupted. In this way, the data cannot be output. An arrangement that is not shown here provides for the second evaluation unit 19 to transmit an error message to the output unit 20 in the event of the values deviating from one another, which outputs this error message visibly to the user.

In FIGS. 1a to 3, electrodes 6, 7 and 8 are only shown schematically and in an obvious manner. In the embodiments, the electrodes preferably do not protrude into the flow cross-section of the measuring tubes. If the measuring tube arrangements are produced by an extrusion process, the electrodes can already be firmly surrounded by the extrusion mass during extrusion. The same applies to electrical supply lines to the electrodes.

Figure 4:
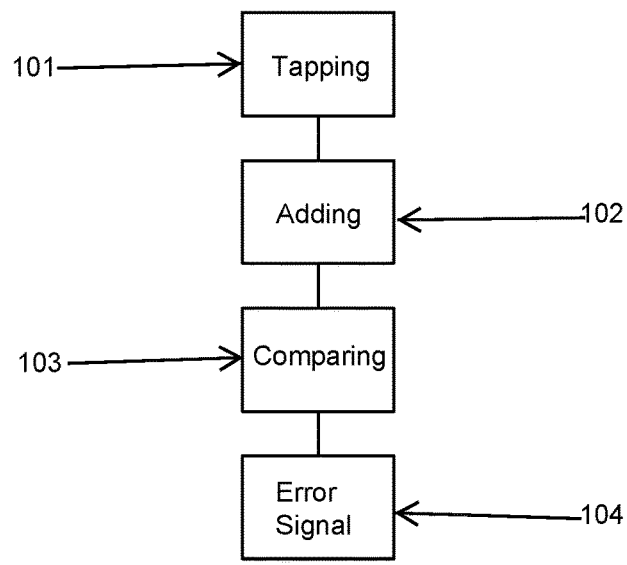
FIG. 4 is a block diagram representing a first embodiment of a method for operating a magnetic-inductive flowmeter.

FIG. 4 shows a block diagram of a first version of a method for operating a magnetic-inductive flowmeter. The method steps described in the method are carried out by the evaluation unit. In a tapping step 101, a first measuring voltage is tapped between the first electrode pair, a second measuring voltage is tapped between the second electrode pair and a measuring voltage is tapped between the first electrode and the third electrode. In an addition step 102, the first measuring voltage and the second measuring voltage are added before the value of the added measuring voltages is compared with the value of the measuring voltage tapped between the first electrode and the third electrode in a comparison step 103. Since the second electrode is part of both the first electrode pair and the second electrode pair, the sum of the first measuring voltage and the second measuring voltage must correspond to the value of the measuring voltage between the first and third electrodes. If this is not the case, an error state exists. An error state is then signaled in error signalization step 104.

Figure 5:
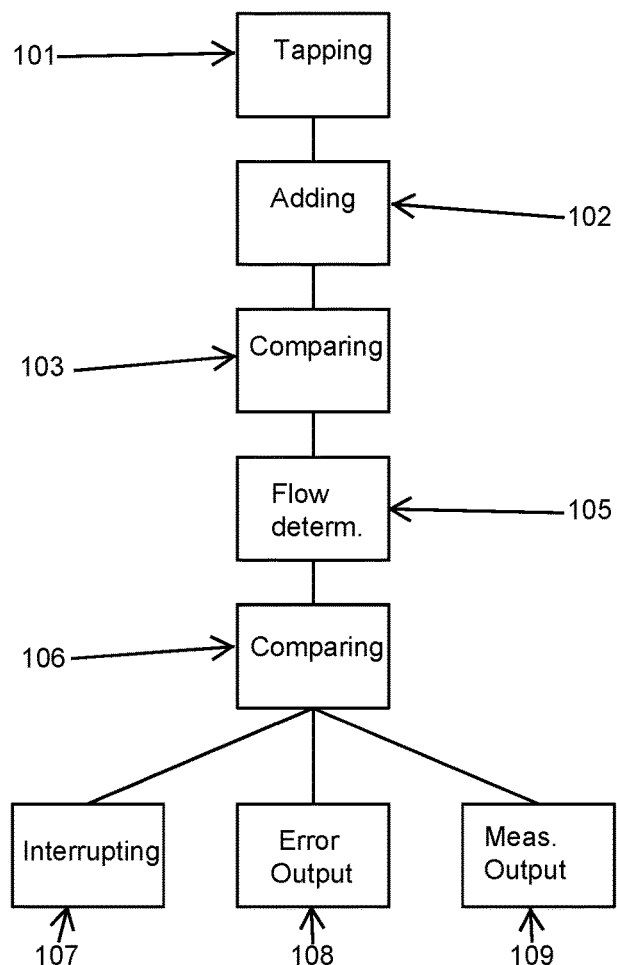
FIG. 5 is a block diagram representing a second embodiment of a method for operating a magnetic-inductive flowmeter.

FIG. 5 shows a block diagram of a second version of a method for operating a magnetic-inductive flowmeter. The first method steps 101, 102 and 103 correspond to the method steps shown in FIG. 4. If there is no error state, the sum of the first and second measuring voltages corresponds to the value of the measuring voltage between the first electrode and the third electrode. The flow determination step 105 comprises that, in the first evaluation unit, the flow of the medium in the first measuring tube is determined with the first measuring voltage, in the first evaluation unit the flow of the medium in the second measuring tube is determined with the second measuring voltage, the flow difference between the two measuring tubes is determined, in the second evaluation unit the flow of the medium in the first measuring tube is determined with the first measuring voltage, in the second evaluation unit the flow of the medium in the second measuring tube is determined from the second measuring voltage and the flow difference between the two measuring tubes is determined. The two evaluation units thus determine the values for the individual flows in the first and second measuring tubes as well as one value each for the flow difference. In a comparison step 106, the second evaluation unit then reads in the values determined by the first evaluation unit and compares them with its values. In the event of a deviation of the values of the first evaluation unit from the values of the second evaluation unit, communication between the first evaluation unit and the output unit and/or communication between the second evaluation unit and the output unit is interrupted in an interruption step 107 so that no measurement values, in particular no erroneous measurement values, can be output. Alternatively it is shown that in the case of a deviation of the values from one another an error message is output by the output unit in an error output step 108.

If the values do not differ from one another, then the value for the flow in the first measuring tube and/or the value for the flow in the second measuring tube and/or the value for the flow difference from the output unit are output in a measurement value output step 109 for a user.

What is claimed is:

1. A magnetic-inductive flowmeter for determining the flow of at least one medium, comprising:
   a first measuring tube and a second measuring tube for guiding the at least one medium, the measuring tubes running parallel to one another,
   a magnetic field generating device for generating a magnetic field in a direction for permeating the measuring tubes perpendicular to a flow direction of the at least one medium,
   a first electrode pair for tapping a first measuring voltage induced in the medium in the first measuring tube,
   a second electrode pair for tapping a second measuring voltage induced in the medium in the second measuring tube, and
   an evaluation unit for evaluating the measuring voltages,
   wherein the first electrode pair and the second electrode pair are formed together by a first electrode, a second electrode and a third electrode, wherein the second electrode is both part of the first electrode pair and part of the second electrode pair,
   wherein the second electrode is arranged between the two measuring tubes,
   wherein the three electrodes are arranged along an axis that is perpendicular to the flow direction of the at least one medium and is also perpendicular to the direction of the magnetic field, and
   wherein the magnetic field generating device has a coil arrangement and a control unit for applying a coil current to the coil arrangement, wherein a first coil current measuring device for detecting a first coil current is arranged between the control unit and a first terminal of the coil arrangement, wherein a second coil current measuring device for detecting a second coil current is arranged between a second terminal of the coil arrangement and the control unit, and wherein the evaluation unit is constructed and arranged for comparing the first coil current and the second coil current with one another and for outputting an error message if the coil currents deviate from each other.

2. A magnetic-inductive flowmeter for determining the flow of at least one medium, comprising:
   a first measuring tube and a second measuring tube for guiding the at least one medium, the measuring tubes running parallel to one another,
   a magnetic field generating device for generating a magnetic field in a direction for permeating the measuring tubes perpendicular to a flow direction of the at least one medium,
   a first electrode pair for tapping a first measuring voltage induced in the medium in the first measuring tube,
   a second electrode pair for tapping a second measuring voltage induced in the medium in the second measuring tube, and
   an evaluation unit for evaluating the measuring voltages,
   wherein the first electrode pair and the second electrode pair are formed together by a first electrode, a second electrode and a third electrode, wherein the second electrode is both part of the first electrode pair and part of the second electrode pair,
   wherein the second electrode is arranged between the two measuring tubes,
   wherein the three electrodes are arranged along an axis that is perpendicular to the flow direction of the at least one medium and is also perpendicular to the direction of the magnetic field and
   wherein the evaluation unit has a first evaluation unit and a second evaluation unit that are constructed and arranged for independently determining measured values for the flow of the medium in the first measuring tube and the flow of the medium in the second measuring tube,
   wherein the second electrode is formed from a first partial electrode and a second partial electrode, wherein the two partial electrodes are electrically conductively connected to one another, and
   wherein the first electrode pair is formed by the first electrode and the first partial electrode, wherein the second electrode pair is formed by the second partial electrode and the third electrode and wherein the evaluation unit has an output unit for outputting the measured values and the evaluation unit is adapted for interrupting communication between at least one of the first and second evaluation units and the output unit in the event of an error state so that no measured values are output.

3. The magnetic-inductive flowmeter according to claim 1, wherein the second electrode is formed from a first partial electrode and a second partial electrode, wherein the two partial electrodes are electrically conductively connected to one another, and wherein the first electrode pair is formed by the first electrode and the first partial electrode, and wherein the second electrode pair is formed by the second partial electrode and the third electrode.

4. The magnetic-inductive flowmeter according to claim 1, wherein the first measuring tube and the second measuring tube are materially connected to one another or are formed in one piece.

5. The magnetic-inductive flowmeter according to claim 2, wherein the first measuring tube and the second measuring tube are materially connected to one another or are formed in one piece.

6. The magnetic-inductive flowmeter according to claim 2, wherein the first evaluation unit and the second evaluation unit are adapted for determining a value for a flow difference between the flow in the first measuring tube and the flow in the second measuring tube, and wherein the second evaluation unit compares the measured values determined by the first evaluation unit with the measured values determined by the second evaluation unit and signals an error state in the event that the comparison indicates that the measured values of the flow determined by the first and second evaluation units deviate from one another.

7. The magnetic-inductive flowmeter according to claim 2, wherein the evaluation unit has an output unit for outputting the measured values and for transmitting an error message to the output unit in the event of an error state, and wherein the output unit is adapted to output an error message in response to receipt of the error message.

8. A method for operating a magnetic-inductive flowmeter having a first measuring tube and a second measuring tube for guiding the at least one medium, the measuring tubes running parallel to one another,
- a magnetic field generating device for generating a magnetic field in a direction for permeating the measuring tubes perpendicular to a flow direction of the at least one medium,
- a first electrode pair for tapping a first measuring voltage induced in the medium in the first measuring tube,
- a second electrode pair for tapping a second measuring voltage induced in the medium in the second measuring tube, and
- an evaluation unit for evaluating the measuring voltages,
wherein the first electrode pair and the second electrode pair are formed together by a first electrode, a second electrode and a third electrode, wherein the second electrode is both part of the first electrode pair and part of the second electrode pair,
wherein the second electrode is arranged between the two measuring tubes, and
wherein the three electrodes are arranged along an axis that is perpendicular to the flow direction of the at least one medium and is also perpendicular to the direction of the magnetic field, the method comprising:
a tapping step in which the evaluation unit taps a first measuring voltage between the first electrode pair, a second measuring voltage between the second electrode pair and a third measuring voltage between the first electrode and the third electrode,
an addition step in which the first measuring voltage and the second measuring voltage are added, and
a comparison step in which a value of the added measuring voltages is compared with a value of the voltage tapped between the first electrode and the third electrode,
wherein the evaluation unit has first and second evaluation units, the method further comprising a flow determination step in which the flow of the medium in the first measuring tube is determined in the first evaluation unit using the first measuring voltage, the flow of the medium in the second measuring tube is determined in the first evaluation unit using the second measuring voltage, a flow difference between the two measuring tubes is determined, the flow of the medium in the first measuring tube is determined in the second evaluation unit using the first measuring voltage, the flow of the medium in the second measuring tube is determined in the second evaluation unit using the second measuring voltage and a second flow difference between the two measuring tubes is determined, and
wherein the second evaluation unit compares values determined by the second evaluation unit with values determined by the first evaluation unit and signals an error state if the compared values deviate from one another.

9. The method according to claim 8, comprising the further step of signaling an error state when the comparison step indicates that the values compared deviate from one another.

10. The method according to claim 8, wherein, in the event of an error state, communication between at least one of the first evaluation unit and the output unit or communication between the second evaluation unit and the output unit is interrupted in an interrupting step.

11. The method according to claim 8, wherein, in the event of an error state, an error message is output in an error outputting step.

* * * * *